(12) United States Patent
Rao et al.

(10) Patent No.: US 8,892,528 B2
(45) Date of Patent: *Nov. 18, 2014

(54) ACCELERATED DEDUPLICATION

(71) Applicant: Dell Products L.P., Round Rock, TX (US)

(72) Inventors: Goutham Rao, Los Altos, CA (US); Vinod Jayaraman, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,495

(22) Filed: Aug. 26, 2013

(65) Prior Publication Data

US 2014/0032508 A1 Jan. 30, 2014

Related U.S. Application Data

(63) Continuation of application No. 13/309,455, filed on Dec. 1, 2011, now Pat. No. 8,521,705.

(60) Provisional application No. 61/506,269, filed on Jul. 11, 2011.

(51) Int. Cl.
*G06F 17/00* (2006.01)
*G06F 3/06* (2006.01)
*G06F 17/30* (2006.01)

(52) U.S. Cl.
CPC ........ *G06F 17/30159* (2013.01); *G06F 3/0608* (2013.01); *G06F 3/0641* (2013.01); *G06F 3/0671* (2013.01)
USPC ............ 707/692; 707/687; 707/690; 707/698

(58) Field of Classification Search
CPC ............. G06F 11/1453; G06F 3/0641; G06F 17/30156; G06F 3/0608; G06F 3/067; G06F 17/30584
USPC .................................. 707/692, 687, 690, 698
See application file for complete search history.

(56) References Cited

U.S. PATENT DOCUMENTS

| | | | |
|---|---|---|---|
| 7,103,602 | B2 | 9/2006 | Black et al. |
| 7,921,086 | B1 | 4/2011 | Bromley et al. |
| 8,078,593 | B1 | 12/2011 | Ramarao |
| 8,250,325 | B2 | 8/2012 | Holdman et al. |
| 8,521,705 | B2 | 8/2013 | Jayaraman et al. |

(Continued)

OTHER PUBLICATIONS

"U.S. Appl. No. 13/309,455, Notice of Allowance mailed Apr. 23, 2013", 13 pgs.

*Primary Examiner* — Thanh-Ha Dang
(74) *Attorney, Agent, or Firm* — Kwan & Olynick LLP

(57) ABSTRACT

Mechanisms are provided for accelerated data deduplication. A data stream is received an input interface and maintained in memory. Chunk boundaries are detected and chunk fingerprints are calculated using a deduplication accelerator while a processor maintains a state machine. A deduplication dictionary is accessed using a chunk fingerprint to determine if the associated data chunk has previously been written to persistent memory. If the data chunk has previously been written, reference counts may be updated but the data chunk need not be stored again. Otherwise, datastore suitcases, filemaps, and the deduplication dictionary may be updated to reflect storage of the data chunk. Direct memory access (DMA) addresses are provided to directly transfer a chunk to an output interface as needed.

20 Claims, 6 Drawing Sheets

(56) References Cited

U.S. PATENT DOCUMENTS

| | | | |
|---|---|---|---|
| 8,566,519 B2* | 10/2013 | Lay et al. | 711/114 |
| 8,626,723 B2* | 1/2014 | Ben-Shaul et al. | 707/692 |
| 2002/0169934 A1 | 11/2002 | Krapp et al. | |
| 2003/0105716 A1 | 6/2003 | Lorin, Jr. et al. | |
| 2007/0255758 A1 | 11/2007 | Zheng et al. | |
| 2008/0005141 A1 | 1/2008 | Zheng et al. | |
| 2008/0016131 A1 | 1/2008 | Sandorfi et al. | |
| 2008/0098083 A1 | 4/2008 | Shergill et al. | |
| 2008/0155192 A1 | 6/2008 | Iitsuka | |
| 2009/0089483 A1 | 4/2009 | Tanaka et al. | |
| 2009/0204636 A1 | 8/2009 | Li et al. | |
| 2009/0234892 A1* | 9/2009 | Anglin et al. | 707/201 |
| 2009/0271454 A1* | 10/2009 | Anglin et al. | 707/204 |
| 2010/0077013 A1 | 3/2010 | Clements et al. | |
| 2010/0094817 A1 | 4/2010 | Ben-Shaul et al. | |
| 2010/0299311 A1* | 11/2010 | Anglin et al. | 707/640 |
| 2011/0010498 A1 | 1/2011 | Lay et al. | |
| 2011/0066628 A1 | 3/2011 | Jayaraman | |
| 2011/0071989 A1 | 3/2011 | Wilson et al. | |
| 2011/0099154 A1 | 4/2011 | Maydew et al. | |
| 2011/0179341 A1* | 7/2011 | Falls et al. | 714/807 |
| 2011/0246741 A1* | 10/2011 | Raymond et al. | 711/170 |
| 2012/0030477 A1* | 2/2012 | Lu et al. | 713/189 |
| 2012/0158672 A1 | 6/2012 | Oltean et al. | |
| 2012/0173558 A1* | 7/2012 | Sorenson, III | 707/758 |
| 2013/0018853 A1 | 1/2013 | Jayaraman et al. | |
| 2013/0212074 A1* | 8/2013 | Romanski et al. | 707/692 |
| 2013/0297572 A1* | 11/2013 | Wilson et al. | 707/692 |

* cited by examiner

Figure 2A

| Object Map File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| | Data Table 251 | |
| Index 253 | Data Offset 255 | Data Reference Count 257 |
| 1 | Offset-Data Chunk A | 1 |
| 2 | Offset-Data Chunk B | 1 |
| 3 | Offset-Data Chunk C | 1 |
| | Datastore | |
| | Data 261 | Last File 263 |
| 1 | Data Chunk A | File X 201 |
| 2 | Data Chunk B | File X 201 |
| 3 | Data Chunk C | File X 201 |

Figure 3

| Dictionary 301 ||
|---|---|
| Fingerprint 311 | Storage Location 321 |
| a | Location 323 |
| b | Location 325 |
| c | Location 327 |

| Dictionary 351 ||
|---|---|
| Fingerprint 361 | Storage Location 371 |
| i | Location 373 |
| j | Location 375 |
| k | Location 377 |

ACCELERATED DEDUPLICATION

CROSS-REFERENCE TO RELATED APPLICATIONS

This application claims benefit of priority under 35 U.S.C. §120 to U.S. patent application Ser. No. 13/309,455, entitled "Accelerated Deduplication" filed Dec. 1, 2011, now U.S. Pat. No. 8,521,705, issued on Aug. 27, 2013, which claims priority to Provisional Patent Application No. 61/506,269, entitled "Accelerated Deduplication" filed Jul. 11, 2011, both of which are incorporated in their entirety herein by this reference for all purposes.

TECHNICAL FIELD

The present disclosure relates to accelerated deduplication.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or a hash of the actual data. Once the segment ID is generated, it can be used to determine if the data segment already exists in the system. If the data segment does exist, it need not be stored again.

However, mechanisms for processing data for deduplication are limited. Consequently, techniques and mechanisms are provided to improve data deduplication.

BRIEF DESCRIPTION OF THE DRAWINGS

The disclosure may best be understood by reference to the following description taken in conjunction with the accompanying drawings, which illustrate particular embodiments of the present invention.

FIG. 2A illustrates a particular example of an object map.

FIG. 2B illustrates a particular example of a datastore suitcase.

FIG. 3 illustrates a particular example of a dictionary.

DESCRIPTION OF PARTICULAR EMBODIMENTS

Figure 1:
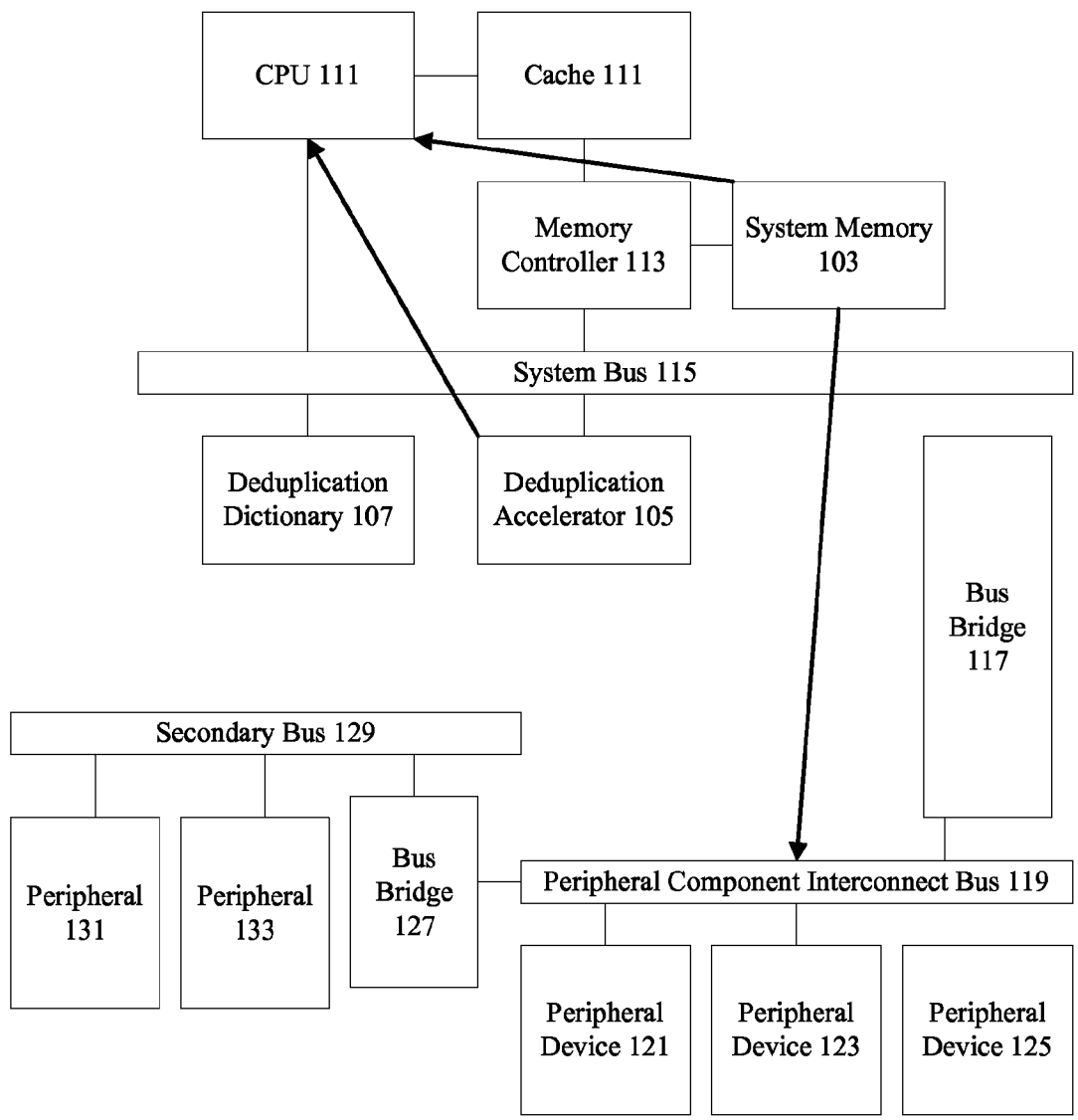
FIG. 1 illustrates a particular example of a system that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular compute nodes and network interfaces. However, it should be noted that the techniques and mechanisms of the present invention apply to a variety of different compute nodes and network interfaces. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for accelerated data deduplication. A data stream is received an input interface and maintained in memory. Chunk boundaries are detected and chunk fingerprints are calculated using a deduplication accelerator while a processor maintains a state machine. A deduplication dictionary is accessed using a chunk fingerprint to determine if the associated data chunk has previously been written to persistent memory. If the data chunk has previously been written, reference counts may be updated but the data chunk need not be stored again. Otherwise, datastore suitcases, filemaps, and the deduplication dictionary may be updated to reflect storage of the data chunk. Direct memory access (DMA) addresses are provided to directly transfer a chunk to an output interface as needed.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compression algorithms operate in a variety of manners, but many compression algorithms analyze data to determine source sequences in data that can be mapped to shorter code words. In many implementations, the most frequent source sequences or the most frequent long source sequences are replaced with the shortest possible code words.

Data deduplication reduces storage footprints by reducing the amount of redundant data. Deduplication may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a fixed or sliding window and uses references to identify matching sequences instead of storing the matching sequences again.

In a data deduplication system, the backup server working in conjunction with a backup agent identifies candidate files for backup, creates a backup stream and sends the data to the deduplication system. A typical target system in a deduplication system will deduplicate data as data segments are received. A block that has a duplicate already stored on the deduplication system will not need to be stored again. However, other information such as references and reference counts may need to be updated. Some implementations allow the candidate data to be directly moved to the deduplication system without using backup software by exposing a NAS drive that a user can manipulate to backup and archive files.

However, processing data for deduplication can itself be resource intensive. In many instances, data is scanned to calculate appropriate chunk boundaries. An algorithm such as Rabin may be used to determine appropriate boundary locations. Data is also scanned to determine chunk fingerprints. The fingerprints may serve as identifiers for the chunks in a deduplication dictionary. Metadata may be delineated for efficient access after deduplication and deduplication dictionaries and datastore suitcases may be generated, updated, and maintained in a distributed manner. Deduplication may be supplemented with compression and can be performed in-line or post-process.

It is recognized that performing fingerprint calculations and chunk boundary calculations can be inefficient. Consequently, the techniques and mechanisms of the present invention provide a pipeline that implements a chunk boundary calculation algorithm as well as a fingerprint algorithm in the same pipeline stage. In particular embodiments, chunk boundary calculation and fingerprint calculation are performed in a single pass. Bus data transfers are reduced.

According to various embodiments, an optimization algorithm runs in software. The optimization algorithms maintains a state machine but does not perform actual processing of the data. In particular embodiments, the optimization algorithms provide a scatter-gather vector of memory areas for a processor to apply boundary identification and fingerprinting algorithms. The resultant computed values are communicated to the software deduplication engine, which then looks up the values in a dictionary and makes a decision as to what to do with the data. The data may be stored for the first time, references and datastore suitcases may be updated or created.

According to various embodiments, deduplication is offloaded from the general purpose processor onto a deduplication engine that may be implemented as an ASIC, programmable chip, or other specially configured device. In particular embodiments, both boundary identification and fingerprinting are performed using the deduplication engine or deduplication accelerator. In other examples, portions of deduplication are still performed by the processor.

According to various embodiments, if the data needs to be transferred to storage, the software stack will communicate to the processor the final destination direct memory access (DMA) addresses for the data. The processor or CPU will directly DMA the data to the target storage address. There is minimal data movement over the system bus.

According to various embodiments, actual data can enter a system over a network and store itself in memory. The processor can apply operations exactly where the data arrived without having to move it to a separate area for deduplication and storage transfer.

FIG. 1 illustrates a particular example of a system that can use the techniques and mechanisms of the present invention. According to various embodiments, data is received at an accelerated deduplication system 101 over an interface such as a network interface. A data stream may be received in segments or blocks and maintained in system memory 103. According to various embodiments, a processor 111 or CPU 111 maintains a state machine but offloads boundary detection and fingerprinting to a deduplication engine or deduplication accelerator 105. The CPU 111 is associated with cache 111 and memory controller 113. According to various embodiments, cache 111 and memory controller 113 may be integrated onto the CPU 111.

In particular embodiments, the deduplication engine or deduplication accelerator 105 is connected to the CPU 111 over a system bus 115 and detects boundaries using an algorithm such as Rabin to delineate chunks of data in system memory 103 and generates fingerprints using algorithms such as hashing algorithms like SHA-1 or MD-5. The deduplication engine 105 accesses the deduplication dictionary 107 to determine if a fingerprint is already included in the deduplication dictionary 107. According to various embodiments, the deduplication dictionary 107 is maintained in persistent storage and maps chunk fingerprints to chunk storage locations. Datastore suitcases, references, metadata, etc., may be created or modified based on the result of the dictionary lookup.

If the data needs to be transferred to persistent storage, the optimization software stack will communicate to the CPU 111 the final destination DMA addresses for the data. The DMA addresses can then be used to transfer the data through one or more bus bridges 117 and/or 127 and secondary buses 119 and/or 129. In example of a secondary bus is a peripheral component interconnect (PCI) bus 119. Peripherals 121, 123, 125, 131, and 133 may be peripheral components and/or peripheral interfaces such as disk arrays, network interfaces, serial interfaces, timers, tape devices, etc.

FIG. 2A illustrates a particular example of a mechanism for delineating data chunks. FIG. 2B illustrates a particular example of a mechanism for managing data chunks. It should be noted that although a particular mechanism is described, a wide variety of mechanisms can be used. According to various embodiments, object map file X 201 includes offset 203, index 205, and lname 207 fields. In particular embodiments, each chunk in the object map for file X is 8K in size. In particular embodiments, each data chunk has an index of format <Datastore Suitcase ID>. <Data Table Index>. For example, 0.1 corresponds to suitcase ID 0 and datatable index 1, while 2.3 corresponds to suitcase ID 2 and database index 3. The chunks corresponding to offsets 0K, 8K, and 16K all reside in suitcase ID 0 while the data table indices are 1, 2, and 3. The lname field 207 is NULL in the object map because each chunk has not previously been referenced by any file.

FIG. 2B illustrates one example of a datastore suitcase corresponding to the object map file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 251 includes three offset reference count pairs which map to the data chunks of the object map file X 201. In the index portion, index 1 corresponding to data in offset-data chunk A has been referenced once. Index 2 corresponding to data in offset-data chunk B has been referenced once. Index 3 corresponding to data in offset-data chunk C has been referenced once. In the data portion, index 1 includes data chunk A and a reference to File X 201 which was last to place a reference on the data chunk A. Index 2 includes data chunk B and a reference to File X 201 which was last to place a reference on the data chunk B. Index 3 includes data chunk C and a reference to File X 201 which was last to place a reference on the data chunk C.

FIG. 3 illustrates multiple dictionaries assigned to different fingerprints. According to various embodiments, the fingerprints values are checksums, SHA/SHA1/SHA-256 hash values. In particular embodiments, dictionary 301 is a deduplication dictionary used by a first node and includes fingerprint ranges from 0x0000 0000 0000 0000-0x0000 0000 FFFF FFFF. Dictionary 351 is used by a second node and includes fingerprint ranges from 0x0000 0001 0000 0000-0X0000 0001 FFFF FFFF. Fingerprints 311 within the range for dictionary 301 are represented by symbols a, b, and c for simplicity. Fingerprints 361 within the range for dictionary 351 are represented by symbols i, j, and k for simplicity. According to various embodiments, each fingerprint in dictionary 301 is mapped to a particular storage location 321 such as location 323, 325, or 327. Each fingerprint in dictionary 351 is mapped to a particular storage location 371 such as location 373, 375, and 377.

Having numerous small chunks increases the likelihood that duplicates will be found. However, having numerous small chunks decreases the efficiency of using the dictionary itself as well as the efficiency of using associated object maps and datastore suitcases.

Figure 4:
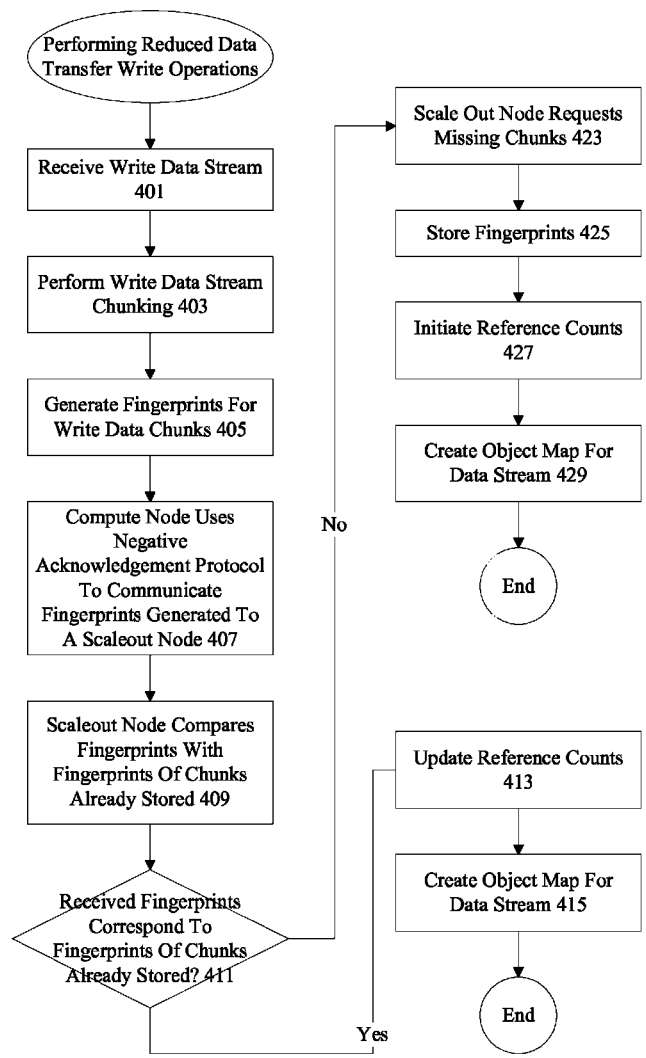
FIG. 4 illustrates a particular example of a technique for performing reduced data transfer write operations.

FIG. 4 illustrates a particular example of a technique for performing reduced data transfer write operations. According to various embodiments, a compute node receives a write data stream at 401. In particular embodiments, the compute node performs write data stream chunking at 403. The compute node may divide the write data stream into fixed size chunks or variable size chunks. The compute node may also perform analysis to identify chunk boundaries. In particular embodiments, the data stream is divided into chunks to allow for deduplication, although chunking may also be useful in a variety of other applications. At 405, fingerprints are generated for the chunks. Fingerprints may be checksums, hash values, or any other sequence that can be used to identify individual chunks.

At 407, the compute node uses a negative acknowledgement (N-ACK) protocol to communicate the fingerprints it has just calculated. The scale out node receives the fingerprints and compares the fingerprints it receives with the fingerprints of chunks locally stored at 409. If it is determined that received fingerprints correspond to fingerprints already stored at 411, reference counts are updated for the chunks at 413 and an object is created for the data stream at 415.

If it is determined that received finrgerprints do not correspond to fingerprints already stored at 411, the scale out node requests the missing chunks at 423. The scale out node also stores the fingerprints at 425. Reference counts are initiated at 427 and an object map is created for the data stream at 429.

Figure 5:
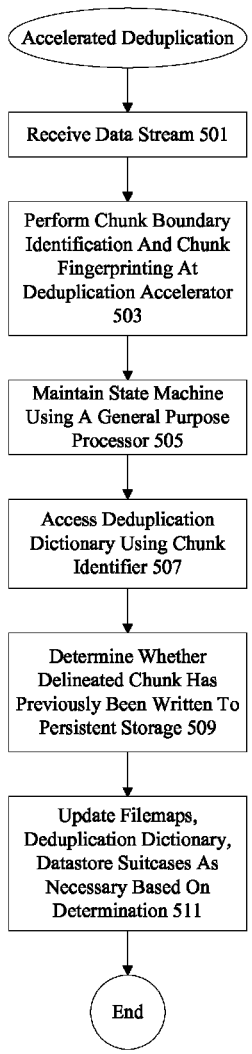
FIG. 5 illustrates a particular example of a technique for performing reduced data transfer read operations.

FIG. 5 illustrates a particular example of a technique for performing accelerated deduplication. At 501, a data stream is received. According to various embodiments, the data stream is data received as part of an inline or post process operation. At 503, a deduplication accelerator perform chunk boundary identification and chunk fingerprinting. Chunk boundary identification may entail selecting boundaries used in deduplication. In particular embodiments, chunk boundaries are identified upon detecting particular bit sequences, patterns, or arrangements before and/or after performing some operation on the data. Chunk fingerprinting may entail calculating an identifier such as a hash that can be used to identify the chunk with reasonable certainty.

According to various embodiments, a general purpose processor such as a CPU maintains a state machine used for deduplication, but offloads the chunk boundary determination and chunk fingerprinting operations to the deduplication accelerator at 505. In particular embodiments, a deduplication dictionary is accessed using the chunk identifier at 507. According to various embodiments, the deduplication dictionary maintains numerous chunk fingerprints and corresponding information that can be used to identify their location in persistent storage. At 509, it is determined whether a delineated chunk has previously been written to persistent storage. It the delineated chunk has previously been written, reference counts may be updated but the data need not be stored again. If the delineated chunk has not previously been written, filemaps, datastore suitcases, and the deduplication dictionary may be updated as necessary at 511.

Figure 6:
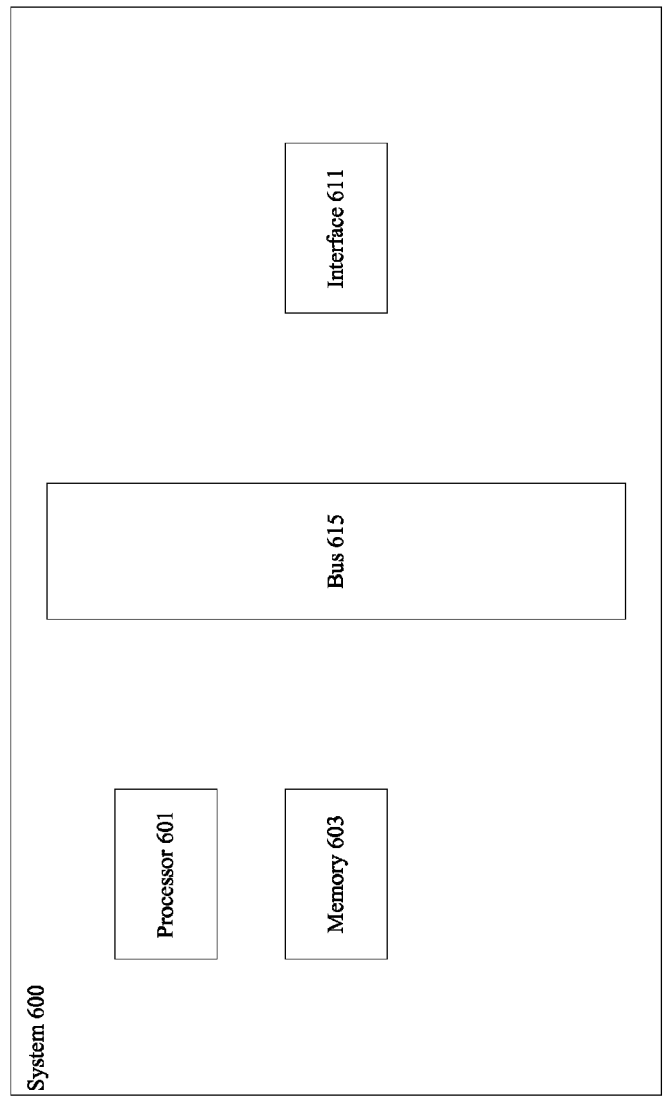
FIG. 6 illustrates a particular example of a computer system.

A variety of devices and applications can implement particular examples of the present invention. FIG. 6 illustrates one example of a computer system. According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

Consequently, the techniques and mechanisms of the present invention provide a pipeline that implements a chunk boundary calculation algorithm as well as a fingerprint algorithm in the same pipeline stage. In particular embodiments, chunk boundary calculation and fingerprint calculation are performed in a single pass. Bus data transfers are reduced.

What is claimed is:

1. A method, comprising:
    performing, by using a processor, chunk boundary calculation and chunk fingerprint calculation on a data stream at a deduplication accelerator in a single pipeline stage, wherein chunk boundary calculation delineates a first chunk and chunk fingerprint calculation determines a chunk identifier for the first chunk, wherein chunk boundary calculation and chunk fingerprint calculation are used to perform deduplication on the data stream; and
    accessing a deduplication dictionary using the chunk identifier to determine whether a first chunk has previously been written to persistent storage.

2. The method of claim 1, wherein chunk boundary calculation and chunk fingerprint calculation are performed in a single pass.

3. The method of claim 2, wherein a processor is operable to maintain a state machine used by the deduplication accelerator for chunk boundary calculation and chunk fingerprint calculation.

4. The method of claim 1, wherein the deduplication dictionary includes a plurality of chunk identifiers corresponding to a plurality of storage locations for a plurality of data chunks.

5. The method of claim 1, wherein chunk fingerprint calculation comprises calculating a hash for the first chunk delineated by identified chunk boundaries.

6. The method of claim 1, wherein the processor maintains a state machine and implements data stream optimization without performing chunk boundary calculation and chunk fingerprint calculation on the data stream.

7. The method of claim 1, wherein the processor uses direct memory access to transfer data to target addresses.

8. The method of claim 1, wherein the deduplication accelerator is an application specific integrated circuit (ASIC).

9. The method of claim 1, wherein the deduplication accelerator is a programmable logic device.

10. A deduplication accelerator, comprising:
    an input interface configured to read a data stream;
    a memory configured to maintain the data stream; and
    logic configured to perform chunk boundary calculation and chunk fingerprint calculation for the data stream in a single pass read to perform data deduplication on the data stream, wherein chunk boundary calculation delineates a first chunk and chunk fingerprint calculation determines a chunk identifier for the first chunk, wherein the chunk identifier is used to access a deduplication dictionary to determine whether the first chunk has previously been written to persistent storage.

11. The deduplication accelerator of claim 10, wherein chunk boundary calculation and chunk fingerprint calculation are performed in a single pass.

12. The deduplication accelerator of claim 11, wherein a processor is operable to maintain a state machine used for chunk boundary calculation and chunk fingerprint calculation.

13. The deduplication accelerator of claim 10, wherein the deduplication dictionary includes a plurality of chunk identifiers corresponding to a plurality of storage locations for a plurality of data chunks.

14. The deduplication accelerator of claim 10, wherein chunk fingerprint calculation comprises calculating a hash for the first chunk delineated by identified chunk boundaries.

15. The deduplication accelerator of claim 10, wherein the processor maintains a state machine and implements data stream optimization without performing chunk boundary calculation and chunk fingerprint calculation on the data stream.

16. The deduplication accelerator of claim 10, wherein the processor uses direct memory access to transfer data to target addresses.

17. The deduplication accelerator of claim 10, wherein the deduplication accelerator is an application specific integrated circuit (ASIC).

18. The deduplication accelerator of claim 10, wherein the deduplication accelerator is a programmable logic device.

19. A system, comprising:
    a deduplication accelerator configured to perform chunk boundary calculation and chunk fingerprint calculation on a data stream in a single pipeline stage, wherein chunk boundary calculation delineates a first chunk and chunk fingerprint calculation determines a chunk identifier for the first chunk, wherein chunk boundary calculation and chunk fingerprint calculation are used to perform deduplication on the data stream, wherein the data stream is maintained in memory; and
    wherein a deduplication dictionary is accessed using the chunk identifier to determine whether a first chunk has previously been written to persistent storage.

20. The system of claim 19, wherein chunk boundary calculation and chunk fingerprint calculation are performed in a single pass.

* * * * *